United States Patent [19]

Takano et al.

[11] 3,760,163

[45] Sept. 18, 1973

[54] PROGRAMMING DEVICE

[75] Inventors: Hirotugu Takano; Toshitsugu Inoue, both of Kyoto, Japan

[73] Assignee: Matsushita Electric Industrial Co., Ltd., Osaka, Japan

[22] Filed: June 14, 1971

[21] Appl. No.: 152,807

[30] Foreign Application Priority Data

| | | |
|---|---|---|
| June 19, 1970 | Japan | 45/53681 |
| June 19, 1970 | Japan | 45/53682 |
| June 19, 1970 | Japan | 45/53683 |
| July 20, 1970 | Japan | 45/64112 |

[52] U.S. Cl. ........... 235/61.11 C, 200/46, 178/17.5, 340/339

[51] Int. Cl. ........... G06k 7/04

[58] Field of Search ........... 235/61.12 N, 61.6 K; 200/46; 340/347 AD, 347 P, 365; 178/17.5; 340/339

[56] References Cited

UNITED STATES PATENTS

| | | | |
|---|---|---|---|
| 2,232,166 | 2/1941 | Colman | 178/17.5 |
| 3,437,767 | 4/1969 | Montgomery | 200/46 X |
| 3,624,772 | 11/1971 | Grunwald | 235/61.12 N |
| 3,387,267 | 6/1968 | Little | 340/347 P |
| 3,310,778 | 3/1967 | Grundfest et al. | 200/46 X |
| 3,194,888 | 7/1965 | Bach | 200/46 X |

*Primary Examiner*—Maynard R. Wilbur
*Assistant Examiner*—Joseph M. Thesz, Jr.
*Attorney*—Stevens, Davis, Miller & Mosher

[57] ABSTRACT

A programming device comprising a plurality of code pins each supplying a multiplicity of different kinds of information, a plurality of switches for converting such information into electrical signals, and an endless belt on which the code pins are arranged in different manners, whereby required information is easily obtained as an electrical signal for controlling the operation of an automatic machine.

3 Claims, 13 Drawing Figures

H. TAKANO
AND
T. INOUE
INVENTORS

BY Stevens, Davis, Miller & Mosher
ATTORNEYS

PROGRAMMING DEVICE

The present invention relates to a programming device or more in particularly a programming device for supplying information required for job processes in order to automatically repeat the operation of an automatic machine or the like.

A conventional device is known which, in order to have simple automatic operations performed machine tools or assemblying machines, has a rotary drum with a multiplicity of dogs around it so that when the drum rotates, parts of switches provided opposite the drum are operated by the dogs for sequence control. In a programming device of this type, complicated sequence control requires the device itself to be quite large, extremely complicated programming and limited drum diameter, resulting in the disadvantage that the maximum number of available job steps is limited, making almost impossible complicated sequence control.

Another prior art programming device intended for complicated sequence control consists of an optical paper tape reader provided with a photo transistor which reads information from punched paper tape and converts such information into electrical signals. A device of this type, however, requires a very complicated electronic circuit to be incorporated into it and the information contained in the punched tape cannot be visually identified. Also, the tape punching operation requires considerable skill. Maintenance and handling are also difficult, and there are such unstable factors as variations in light source and light transmitted through the tape. In addition, the output signal is so small that it is not applicable where large output signals are required.

An object of the present invention is to produce electrical signals by opening and closing switches in accordance with the recesses and protrusions formed on the code pins, whereby the meaning of each electrical signal can be identified by referring to the recesses and protrusions and at the same time an electrical signal with a large current is obtained.

Another object of the present invention is to provide a code pin with four sections formed with recesses or protrusions representing different units, whereby many kinds of information can be distinguished from each other by means of a single code pin.

Still another object of the present invention is to form a belt of a plurality of code pin carrying bars coupled with each other, whereby many different kinds of information are obtained with a small device.

Still another object of the present invention is to change the number of the code pin carrying bars and to detachably and slidably mount a code pin on each of the code pin carrying bars thereby obtaining a great variety of programs.

Still another object of the present invention is to form protrusions on the bottom of each code pin carrying bar, which protrusions engage with a tooth of a gear so that the belt is fed accurately without any erroneous operation.

Still another object of the present invention is to provide a plurality of levers each couple of which is disposed opposite each recess or protrusion of each code pin while the other ends of the levers are opposed to the operating portions of a plurality of switches arranged three-dimensionably, whereby the switches are accurately operated in accordance with the recesses and protrusions formed on the code pins thereby correctly converting into electrical signals information supplied by the code pins.

The programming device according to the present invention will find application in the automatic operation of machine tools, assembly machines and other industrial machines and in the sequence operation of various kinds of plant, a typical example of the possible application being in an input device of numerically-controlled equipment.

The above and other objects, features and advantages will be made apparent by the detailed description taken in conjunction with the accompanying drawings, in which.

Figure 11A:
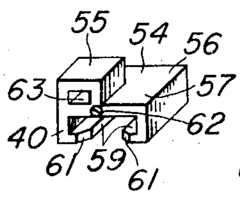
Figure 11B:
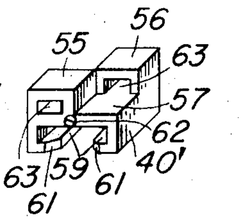
Figure 12:
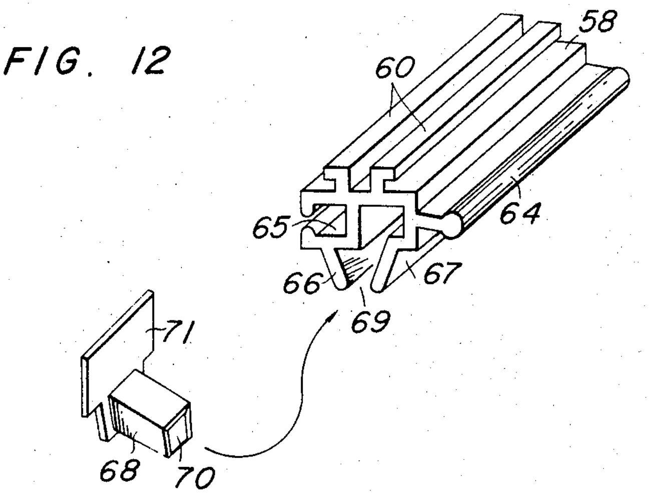

FIGS. 11*a* and 11*b* are diagrams showing perspective views of different kinds of code pin; and FIG. 12 shows a perspective view of an end of the code pin carrying bar as it is dismantled.

Explanation will be made first of an embodiment of the present invention as it is applied in a numerical control for automatic positioning of a machine tool table with reference to the accompanying drawings.

For convenience, the explanation will be limited to the position control of a table moving in one axial direction only. The present invention, however, is also applicable to a machine tool with a table which moves in two or three axial directions.

Figure 1:
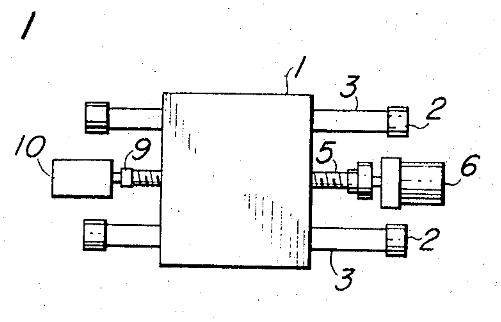
FIG. 1 shows a plan view of a positioning system controlled by a programming device according to an embodiment of the present invention.
Figure 2:
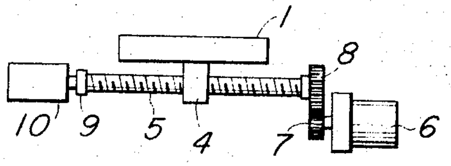
FIG. 2 shows a side view of the same positioning system.

Referring to FIGS. 1 and 2, a table 1 is mounted on and slidable in the right or left direction along rails 3 which are fixed by means of bearings 2. The table 1 is fed by a combination of a nut 4 fixed at the center of the table and a lead screw 5. The lead screw 5 is connected with a motor 6 through gears 7 and 8 and the rotational angle thereof is always detected by a rotational angle detector 10 attached to the lead screw 5 through the coupling 9, the detector 10 comprising a coded disc type A-D converter for converting rotational angles into digital electrical signals.

Figure 4:
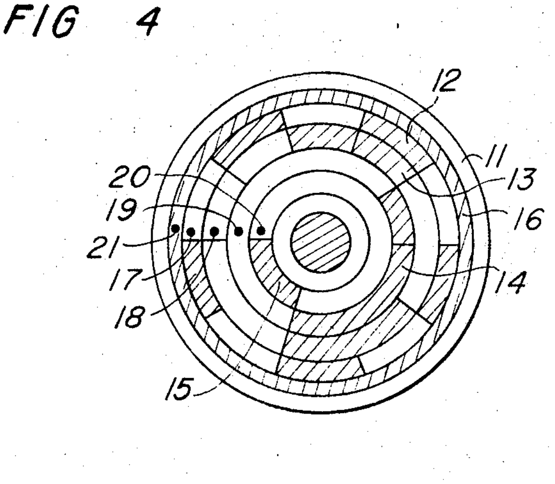
FIG. 4 is a schematic diagram showing the construction of a detector provided on the control means.

The coded disc as shown in FIG. 4 will be now explained. This coded disc is provided for dividing a disc 11 into 10 equal portions as to rotational angle, and comprises thin conductors 12, 13, 14, 15 and 16 which are pasted on the shadowed portion of the disc 11 made of insulating material. The conductors 12, 13, 14, 15 and 16 are electrically connected with each other and have brushes 17, 18, 19, 20 and 21 opposed them respectively. When the disc 11 rotates, the conductors 12, 13, 14 and 15 are connected or disconnected with the brushes 17, 18, 19 and 20 respectively depending on the angular position of the disc 11, while the conductor 16 is maintained connected with the brush 21. The conductors 12, 13, 14 and 15 respectively represent numerical values corresponding to the units of 1, 2, 4 and 8 so that the angular position of the disc 11 at a given time is shown by the sum of numerical values of conductors or a conductor electrically connected with brushes or a brush. Therefore, it is possible to know the rotational angle of the disc 11 in the form of variations in numerical value by detecting conductive or non-conductive states of the brush 21 and other brushes 17, 18, 19 and 20. Although one rotation of the coded disc 11 of FIG. 4 is divided into 10 equal portions, it can also be divided into 100 equal portions by connecting the disc 11 to another coded disc through a reduction gear with the reduction ratio of 10 to 1. Similarly, it is also possible to divide one rotation of the coded disc 11 into 1,000 or 10,000 equal portions. Since the detector 10 of the above-mentioned construction is mounted on the lead screw 5 as shown in FIG. 1, the rotational angle of the lead screw 5 or the distance covered by the table 1 can be detected as variations of numerical values.

Figure 3:
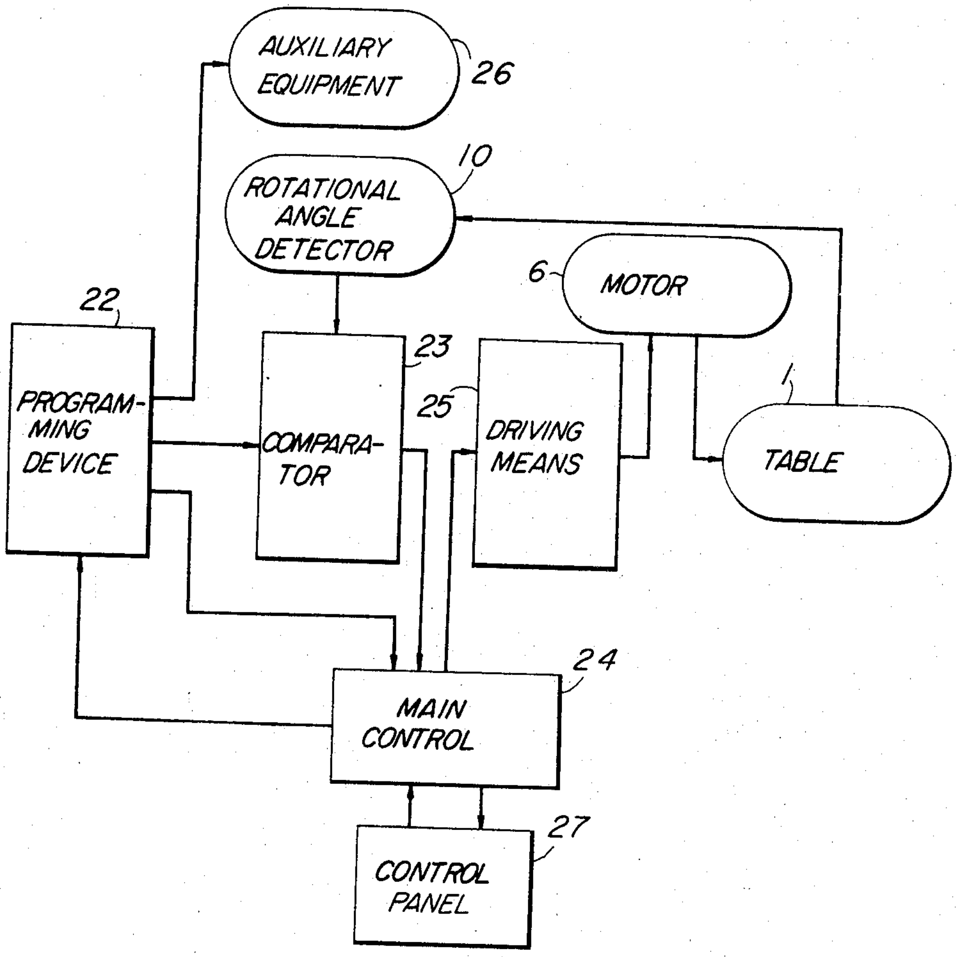
FIG. 3 is a block diagram showing means for controlling the positioning system.

While thus detecting the position of the table 1 by means of the detector 10, the table 1 is driven by the motor 6 and when it reaches a predetermined position, the motor 6 is stopped by a control circuit shown in FIG. 3 thereby accurately stopping the table 1 at that position. The reference numeral 22 in FIG. 3 shows the programming device according to the present invention which will be described in detail later. This programming device supplies information in the form of a combination of ON and OFF states of switches which is needed for a positioning operation. It can not only repeat several different pieces of information successively, but supply a different piece of processing information at any time a machine is required to do a new job. The programming device 22 has within it four switches against one coded disc, and those switches represent numerical values corresponding to the units of 1, 2, 4 and 8 respectively which are combined differently to indicate numerical values from zero to nine. These four switches constitute one set, and there are provided as many sets of switches as digits required for positioning operation. To represent a numerical value with three digits, for example, 465 mm, it is necessary to provide three sets of switches or 12 switches.

Numerical information thus provided by the programming device 22 in the form of a combination of ON and OFF states of the switches supplied compared in the comparator circuit 23 with numerical information supplied by the detector 10 in the form of a combination of conductive and non-conductive states of the conductors. The comparator circuit 23, after comparing these two kinds of information, instructs the driving means 25 on the rotational direction of the motor 6 through the main control 24, while at the same time calculating the difference between the above-mentioned two numerical values and instructing the driving means 25 on the rotational speed of the motor 6 in accordance with the difference through the main control 24. Further, when the two numerical values agree with each other, the comparator circuit 23 orders the motor 6 to stop. On completion of the positioning of the table 1, a signal is supplied from the comparator circuit 23 to the main control 24, whereby the programming device 22 proceeds by one step for the next positioning operation.

Auxiliary equipment 26 is provided for the purpose of performing other operations required for automatic control such as starting and stopping of the main spindle of a drilling machine and supply of cutting oil. The auxiliary equipment 26 is controlled by other switches in the programming device 22.

A control panel 27 is provided for the purpose of switching on and off power supply to the control system as a whole or manual operation of the programming device 22.

The programming device 22 will be now explained in detail with reference to FIG. 5 and succeeding drawings. Referring to FIG. 6, the reference numerals 28, 29, 30 and 31 show a set of switches mentioned above, representing numerical values corresponding to the units of 8, 4, 2 and 1 respectively. These switches are opened or close by the levers 32, 33, 34 and 35. The levers 32 and 33 swing about the axis 36, and the levers 34 and 35 about the axis 37. The ends of the four levers opposite to the ones operating the switches 28, 29, 30 and 31 reach the top of a code pin 40 mounted on the belt which is intermittently rotated by means of the gear 38, so that the levers 32, 33, 34 and 35 operate in accordance with the mechanical recesses and protrusions formed on the code pin 40, thereby controlling the corresponding switches 28, 29, 30 and 31, with the result that mechanical information supplied by the code pin 40 is converted into electrical signals.

When the belt 39 is rotated by the action of gear 38, a lever 41 and bars 42 and 43 function to lift the left ends of the levers 32, 33, 34 and 35 away from the code pin 40 in such a manner that the cam follower 46 is pushed leftwards by the cam 45 in a predetermined timing to cause the lever 41 to rotate about the axis 47. At this time, the switches 28, 29, 30 and 31 are all closed, while further rotation of the cam 45 causes the lever 41 to return to position, lowering the bars 42 and 43. The levers 32, 33, 34 and 35 are again brought into contact with the code pin 40 by the power of restitution of the switches 28, 29, 30 and 31 corresponding to the levers 32, 33, 34 and 35 respectively, whereby only those levers which are in contact with the recess of the code pin 40 are lowered, opening corresponding switches, while the levers in contact with the protrusion of the code pin 40 are unable to lower any more, keeping corresponding switches closed.

Figure 7:
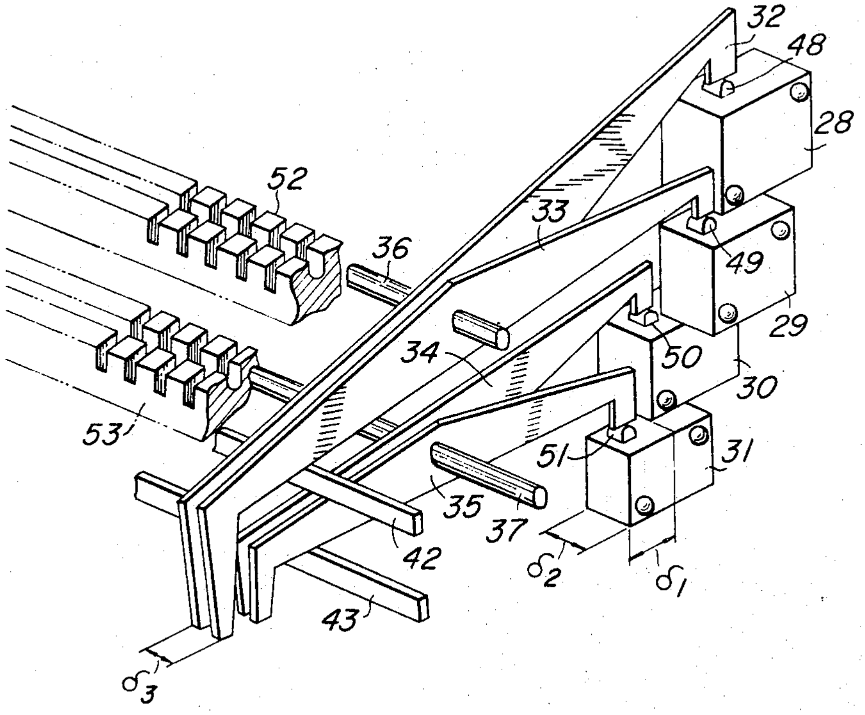
FIG. 7 is a schematic diagram showing the construction of the operating section of switches.

The arrangement of the levers and switches will be now explained in detail. A perspective view of the levers and switches corresponding to one code pin 40 is shown in FIG. 7. The switches 28, 29, 30 and 31 have such a special construction that space occupied by them is minimized, they are easily wired to obtain electrical signals from them, and the opening and closing operations of them are controlled in accordance with the recesses and protrusions of the code pin and the corresponding operation of the levers.

Figure 5:
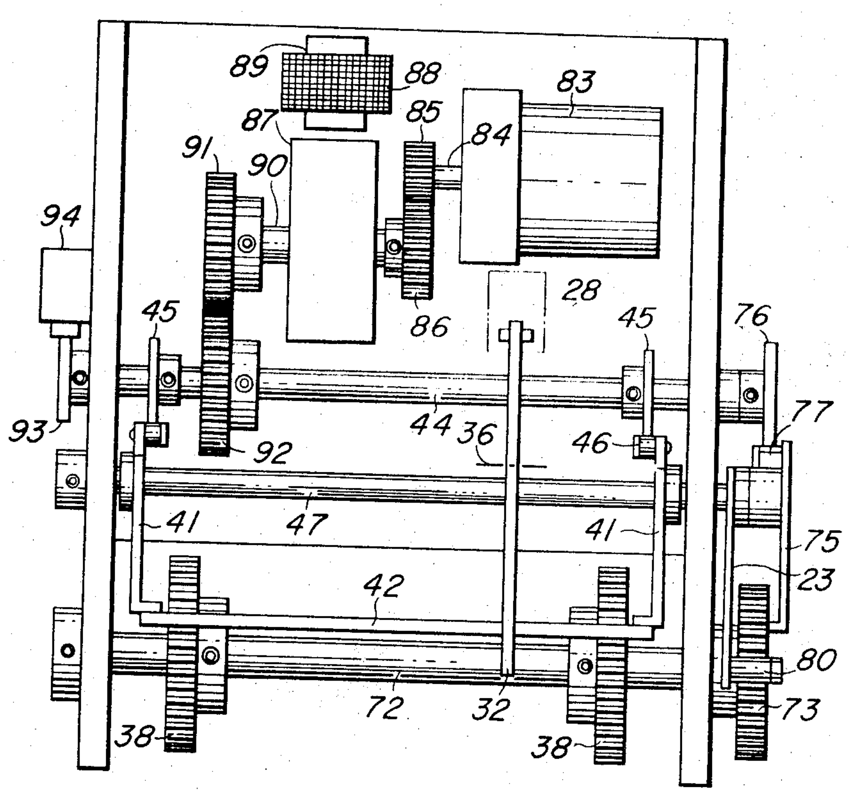
FIG. 5 shows a top view of the programming device.
Figure 6:
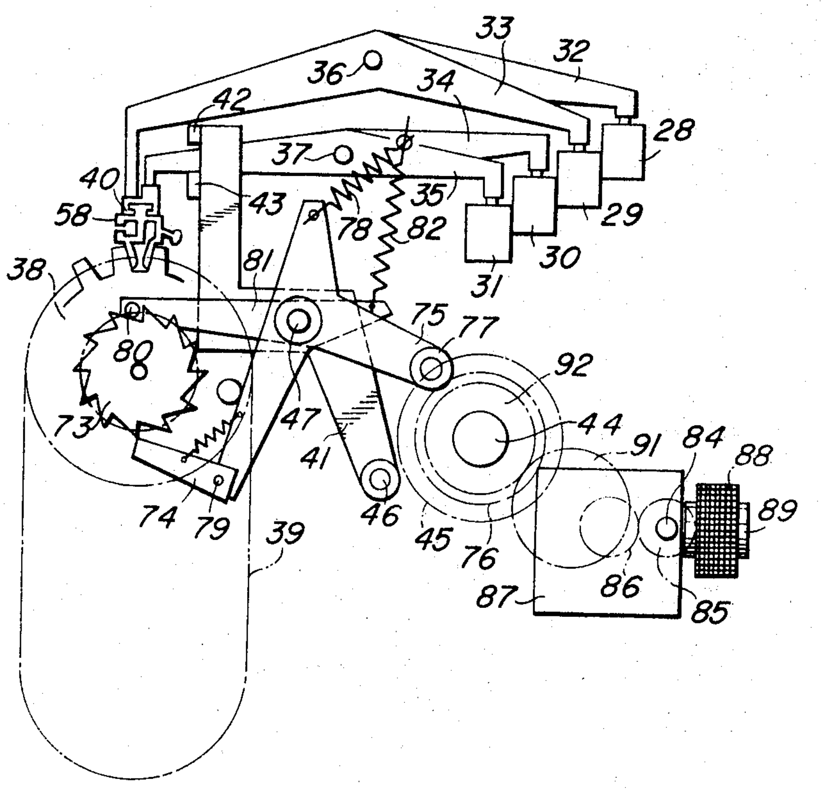
FIG. 6 shows a side view of the essential parts of the programming device.

The device shown in FIGS. 5 and 6 comprises one code pin, four levers and four switches. A multiplicity of switching systems one of which is shown in FIG. 3 are arranged breadthwise and therefore the switches 28, 29, 30 and 31 had best be arranged three-dimensionally as shown in FIG. 7. An end of each lever, as shown in FIGS. 11*a* and 11*b*, contacts the recess or protrusion on the top of the small code pin. The four switches in FIG. 7 are laid one on another in close contact and arranged in steps each at a distance of $\delta_1$, while being transversely staggered by one half of the switch width $\delta_2$. On the other band, the levers 32 and 33 swing on the same axis and control the switches 28 and 29 respectively. For this purpose, the levers 32 and 33 are transversely kept at a distance of $\delta_2/2=\delta_3$ from each other. This holds true also for the levers 34 and 35. Accordingly, the pair of levers 32 and 35 is arranged longitudinally in the same plane as that of levers 33 and 34. The spacers 52 and 53 are provided in order to leave a space $\delta_3$ between the levers 32 and 33 and the levers 34 and 35, respectively. By making such an arrangement as mentioned above, not only the whole device is made compact but also assembly, wiring and adjustment thereof easily facilitated.

Figure 10:
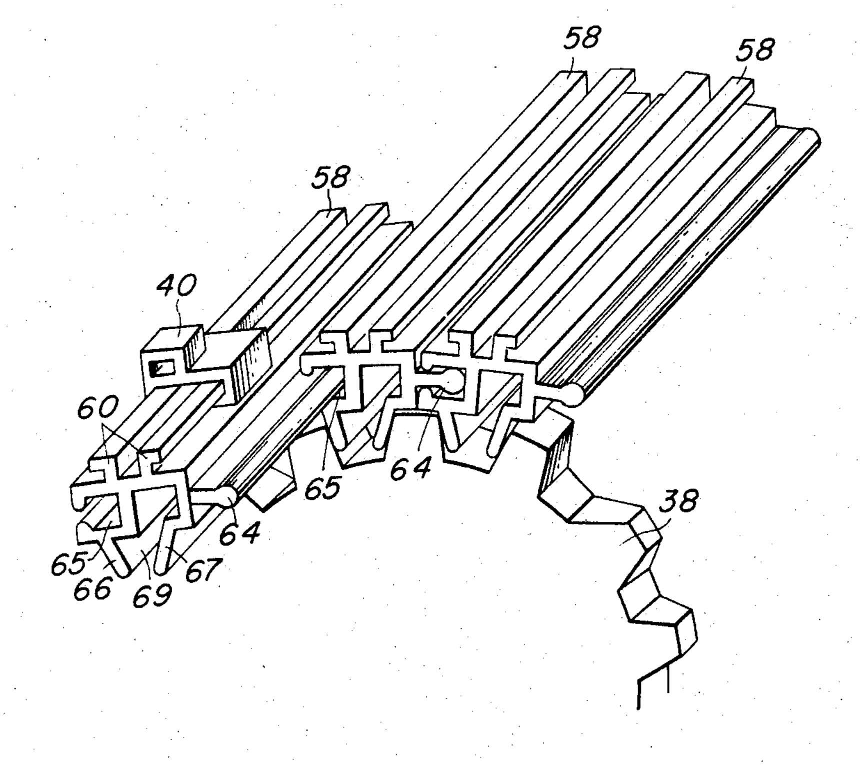
FIG. 10 shows a perspective view of part of a belt composed of code pin carrying bars.

Detailed explanation will be made now of the code pin 40 for controlling the above-described four levers. A perspective view of the different code pins 40 and 40′ is shown in FIG. 11*b*. As can be seen from the drawing, the top of the code pin 40 is divided into four different portions of recesses and protrusions which differently combine to represent numerical values from one to nine and five special symbols. The portions 54, 55, 56 and 57 indicate numerical values corresponding to the units of 8, 4, 2 and 1 respectively. In FIG. 11a, the portion 55 having the units of 4, for example, is protruded and represents the numerical value of 4. In like manner, the portions having the units of 4 and 2 are protruded in FIG. 11b, representing the numerical value of 6. It will be seen from the above description that, by dividing the top of the code pin into four portions having different units of 1, 2, 4 and 8, 16 different pieces of information are identified. In addition, the switches occupy a very small space and a multiplicity of code pins, if any, can be arranged in both directions in a small space. Further, the code pin 40 has its bottom channel-shaped as shown in FIG. 10 so that it can be mounted on the code pin carrying bar 58 constituting the belt 39. The code pin which is made of synthetic resin such as nylon has appropriate flexibility at the hook 59 formed on its channel-shaped portion. As a result, when mounted on the rail of the code pin carrying bar 58 as shown in FIG. 10, it slides along the rail 60 with appropriate flexibility, while it is rarely dislocated by any force applied in the direction perpendicular to the rail 60. Moreover, the corners 61 of the hooks 59 are chamfered as shown in FIGS. 11*a* and 11*b* so as to facilitate the setting of the code pin 40 on the rail 60. Joggles 62 are provided on one side of the code pin to secure equal distances between a multiplicity of code pins and to indicate the side from which the code pin is to be mounted. The hole 63 is provided for the purpose of lessening the deformation of the code pin when it is cooled in molding processes.

Detailed explanation will be made now of the belt 39 on which the code pins are mounted. This belt has a sectional view as shown in FIG. 10 and has at its top rails 60 to receive the code pins. On one side of the code pin carrying bar there is a protrusion 64 with a circular section, while on the other side thereof there is a recess 65 which receives a similar protrusion of another code pin carrying bar 58, so that, as shown in FIG. 10, similar code pin carrying bars 58 are connected in the form of links with some bending ability at each joint of the bars. Further, protrusions 66 and 67 on the bottom of the code pin carrying bar 58 which are inwardly inclined engage with the gear 38. The code pin carrying bar 58 has the same section over the whole length in the longitudinal direction so that it can be manufactured at low cost, for example, by extrusion molding, and at the same time it has the same thickness at various portions thereof so as to minimize the deformation at the time of cooling. The stopper 68, as shown in FIG. 12, is provided for the purpose of preventing each code pin carrying bar 58 from slipping in the transverse direction when a plurality of code pin carrying bars are combined to form the belt 39, and the stopper 68 comprises a protrusion 70 to be inserted into the space 69 between the protrusions 66 and 67 of the code pin carrying bar 58, and a plate 71 to prevent the protrusion 64 of the code pin carrying bar 58 inserted into the recess 65 from slipping in the transverse direction. The code pin 40 can be thus easily and accurately set on the code pin carrying bar 58, and also the belt 39 of a desired length can be formed by connecting a plurality of bars which, with its lower protrusions 66 and 67 engaged with the gear 38, rotates on it.

Detailed description will be made now of a system for driving the gear 38 which engages with and rotates the belt 39, with reference to FIGS. 5 and 6. In FIG. 5, the gear 38 is rotated on the shaft 72 coupled with a ratchet wheel 73 which rotates step by step by the swinging action of the pawl 74 and the ratchet lever 75. FIG. 6 shows the state in which the pawl 74 has moved leftward whereby the ratchet wheel 73 has completed one step of rotation. When the cam 76 on the cam shaft 44 begins rotation, the cam follower 77 is gradually brought upward. This causes the ratchet lever 75 to turn to the left, so that the pawl 74 is moved to the right by a length equivalent to one tooth of the ratchet wheel. When the cam 76 rotates further, the cam follower 77 is lowered again and thereby the ratchet lever turns to the right due to the spring 78, with the result that the pawl 74 rotates the ratchet wheel 73 by one step. The ratchet pawl 74 is rotatably coupled with the ratchet lever 75 by means of the pin 79. The roller 80 is provided to exactly position the ratchet wheel 73 and functions to step the rotation of the pawl 74 when it moves to the right, the roller 80 being kept pressed against the ratchet wheel 73 by means of the indexing lever 81 and the spring 82. Further, when the ratchet wheel 73 and therefore, gear 38, belt 39 and code pin 40 are rotated by one step, the bars 42 and 43 hold up the levers 32, 33, 34 and 35 so as to prevent them from interfering with the rotating operation. The description of the holding up operation is omitted, since it has been described above.

A system for rotating the cam shaft 44 will be explained in detail. In FIG. 5, the reference numeral 83 shows a well-known induction motor whose output shaft 84 roates at a constant speed. This rotation is transmitted to a one-rotation clutch 87 through the gears 85 and 86. The one-rotation clutch 87 the inner construction of which will be described later is provided for the purpose of causing the output shaft 90 to make one rotation only when the iron core 89 is magnetized by the solenoid coil 88. The rotation of the output shaft 90 is transmitted to the shaft 44 through the gears 91 and 92. On completion of one rotation of the shaft 44, that is to say, when the levers 32, 33, 34 and 35 which were raised to feed the belt 39 by one step are returned to the original position, the cam 93 on the cam shaft 44 closes the switch 94 thereby informing the main control 24 of FIG. 3 that the programming device 22 has completed one step of operation. Upon receipt of this information, the main control 24 supplies an energizing signal to the comparator circuit 23.

The construction of the one-rotation clutch 87 will now be explained with reference to FIGS. 8 and 9. Numeral 95 shows a pinion which is kept rotating with the motor 83, the rotational force of the pinion being transmitted to the gear 96, so that the ratchet 97 integrally formed with the gear 96 is kept rotating at a constant speed on the output shaft 90.

Figure 8:
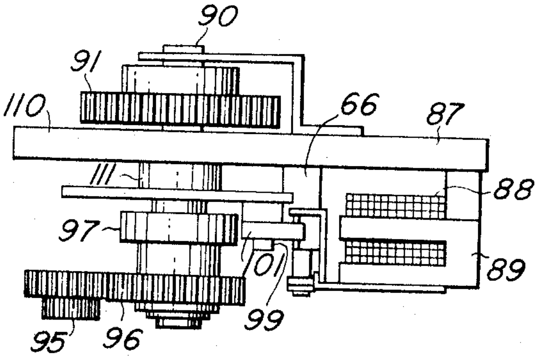
FIG. 8 shows a top view of a clutch mechanism.
Figure 9:
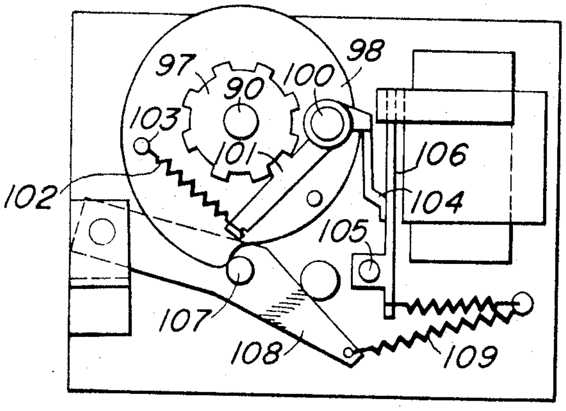
FIG. 9 shows a front view of the clutch mechanism.

On the other hand, the rotary disc 98 has a support 99 fixed on it, as shown in FIG. 8. Further, the pawl 101 is mounted rotatably on the shaft 100 formed on the support 99, the force toward the center of the shaft 90 being always applied to the pawl 101 through the spring 102 and the spring hold 103. This force is for keeping the protrusion of the pawl 101 engaged with the ratchet 97. In order to prevent the pawl and therefore the rotary disc 98 from rotating around the axis 90, the stopper 104 is fixed on the plate 106 which rotates around the support 105. When the solenoid coil 88 is energized to magnetize the iron core 89, the plate 106 is attracted rightward, whereby the stopper 104 comes off the pawl 101 and the rotary disc 98 starts to rotate. FIG. 8 shows the state of the pawl 101 which has engaged with the ratchet wheel 97 and as a result the rotary disc 98 has made one rotation to the right. Further rotation of the rotary disc 98 causes the stopper 104 to prevent the rotation of the pawl 101, thereby disengaging the pawl from the ratchet wheel 97 and stopping the rotary disc 98.

The outer periphery of the rotary disc 98 constitutes a cam and is always profiled by the roller 107, to which force toward the center of the rotary disc 98 is kept applied through the roller lever 108 and the spring 109. In the shown state of the rotary disc 98, force is applied to the roller 107 in such a manner as to rotate the rotary disc 98 toward the right.

When the plate 106 is attracted rightward thereby disengaging the stopper 104 from the pawl 101, the force applied then causes the rotary disc 98 to rotate rightward slightly, disengaging the pawl 101 further from the stopper 104. This results in the pawl 101 engaging with and rotating the rotary disc 98 as mentioned earlier. The rotary disc 98 which is fixed around the shaft 90 rotates about the bearing 111 mounted on the frame 110. Furthermore, the gear 91 is mounted on the shaft 90 for transmitting motion to external parts.

It will be understood from the above description that when the solenoid 88 is energized, the gear 91 makes exactly one rotation.

As can be seen from above, since information is expressed by means of recesses and protrusions formed on the top of code pins according to the present invention, the meaning of a given piece of information is easily understood at a glance of a plurality of the code pins. Conversely, since the information is easily identified by inspection of the recesses and protrusions, the job of processing information is easily done by using combinations of the multiplicity of the code pins.

The information mechanically expressed by th code pins is converted into electrical signals by the opening and closing of switches, which are capable of producing large currents, such as electrical signals for directly controlling the operation of a driving system.

Also, the programming device according to the present invention, which comprises code pins, a belt on which the code pins are mounted and switches, can be made smaller in size than the conventional device using a drum. In addition, there is no need for a complex electrical circuit as in the conventional device employing a photoelectrical paper tape reader. In fact, the programming device according to the present invention is so simple in construction that it is much more easily handled and maintained.

Another advantage of the present invention is that the four portions constituting the top of the code pin which represents the units 1, 2, 4 and 8 permits the identification of 16 kinds of information, so that the desired information is obtained from various combinations of a plurality of such code pins.

Further, since the code pins are adapted to be detachably mounted on any desired parts of the code pin carrying bars, no special skill is needed to mount the code pins.

The above-mentioned belt consists of a multiplicity of code pin carrying bars which are detachably connected with each other, and therefore the length of the belt can be adjusted at will, whereby both simple and complex information is obtainable.

Each code pin carrying bar has two protrusions on the bottom thereof which act as a tooth to engage with an opposing gear, whereby the belt comprising the code pin carrying bars is fed without slippage, thereby preventing erroneous operation.

Still another advantage of the present invention is that since the top of each code pin is connected with four switches through four levers, the switches operate exactly in accordance with the recesses and protrusions formed on the top of the code pin. In addition, the four switches are arranged three-dimensionally and occupy little space, making the whole device compact.

We claim:

1. A programming device comprising a plurality of code pins having recesses and protrusions at predetermined locations thereon, a belt comprising a code carrying bar on which said code pins are mounted in a row slidably and detachably; and a switching mechanism for generating a plurality of signals simultaneously in accordance with the locations of said recesses and protrusions on said code pins, said code pins being moved to a fixed position by rotation of said belt, wherein engaging portions including a plurality of rails are formed on the top of said code pin carrying bar, and wherein a plurality of legs formed on the bottom of said code pins are provided for detachably engaging with said engaging portions, the top of each of said code pins being divided into four equal portions by means of two straight lines at right angles to each other, each portion having a different weight and different protrusion or recess according to the information to be supplied.

2. A programming device comprising a plurality of code pins having recesses and protrusions at predetermined locations thereon, a belt comprising a code carrying bar on which said code pins are mounted in a row slidably and detachably; and a switching mechanism for generating a plurality of signals simultaneously in accordance with the locations of said recesses and protrusions on said code pins, said code pins being moved to a fixed position by the rotation of said belt, wherein each of said code pins has a plurality of legs formed therein; and said code pin carrying bar has a plurality of engaging portions formed on the top thereof, a plurality of protrusions formed on the bottom thereof, and a protrusion on one side and a recess on the other side thereof; said legs being adapted to be detachably mounted on said engaging portions, said plurality of protrusions acting as a tooth for engaging with a gear, and said protrusion being adapted to detachably engage with the recess on an adjacent code pin carrying bar.

3. A programming device comprising a plurality of code pins having recesses and protrusions at predetermined locations thereon, a belt comprising a code carrying bar on which said code pins are mounted in a row slidably and detachably; and a switching mechanism for generating a plurality of signals simultaneously in accordance with the locations of said recesses and protrusions on said code pins, said code pins being moved to a fixed position by the rotation of said belt, wherein the top of each of said plurality of code pins is divided into four sections of protrusions or recesses by two straight lines crossing at right angles to each other; and which further comprises a plurality of code pin carrying bars each having a protrusion on one side thereof and a recess on the other side for recessing a protrusion of another code pin carrying bar, thereby forming a belt consisting of said plurality of code pin carrying bars detachably coupled with each other; a gear which engages with and intermittently drives said belt; and four swingable levers each having an end opposed to one of said four protrusions and recesses of said code pin and the other end opposed to the operating portion of each of four switches arranged three-dimensionally, said four protrusions or recesses of said code pin representing the units of 1, 2, 4 and 8 respectively and thereby being capable of identifying sixteen different kinds of information, said code pin having a plurality of legs which are adapted to detachably engage with engaging portions formed on the top of said code pin carrying bar, said code pin carrying bar having a plurality of protrusions formed on the bottom thereof which are adapted to act as a tooth to engage with said gear, each of said switches being opened and closed in accordance with the said protrusions and recesses of said code pin.

* * * * *